United States Patent [19]

Lucero

[11] Patent Number: 4,675,515
[45] Date of Patent: Jun. 23, 1987

[54] DRIVE-THROUGH CREDIT CARD PAYMENT DEVICE

[76] Inventor: James L. Lucero, 124 Monterey Rd., #118, So. Pasedena, Calif. 91030

[21] Appl. No.: 836,014

[22] Filed: Mar. 4, 1986

[51] Int. Cl.⁴ .............................................. G07F 7/08
[52] U.S. Cl. .................................... 235/381; 235/380
[58] Field of Search ................................ 235/379, 381

[56] References Cited

U.S. PATENT DOCUMENTS

| | | | |
|---|---|---|---|
| 3,237,198 | 2/1966 | Slutsky | 346/17 |
| 3,304,416 | 2/1967 | Wolf | 235/92 |
| 3,445,633 | 5/1969 | Ratner | 235/61.7 |
| 3,611,293 | 10/1971 | Constable | 340/149 A |
| 3,622,995 | 11/1971 | Dilks | 340/153 |
| 3,673,571 | 6/1972 | Constable | 340/149 A |
| 3,697,693 | 10/1972 | Deschenes et al. | 179/2 DP |
| 3,761,682 | 9/1983 | Barnes et al. | 235/61.7 |
| 3,761,683 | 9/1973 | Rogers | 235/61.7 B |
| 3,786,421 | 1/1974 | Wostl et al. | 340/149 A |
| 3,826,344 | 2/1974 | Wahlberg | 194/2 |
| 3,845,277 | 10/1974 | Voss et al. | 235/61.7 B |
| 3,857,018 | 12/1974 | Stark et al. | 235/61.7 B |
| 3,892,948 | 7/1975 | Constable | 340/149 R |
| 3,931,497 | 1/1976 | Gentile et al. | 235/61.7 B |
| 3,935,933 | 2/1976 | Tanaka et al. | 194/4 R |
| 4,068,213 | 1/1978 | Nakamura et al. | 340/149 A |
| 4,073,368 | 2/1978 | Mustapick | 186/1 C |
| 4,114,027 | 9/1978 | Slater et al. | 235/419 |
| 4,169,521 | 9/1978 | Vayda, Jr. | 186/1 C |
| 4,197,986 | 4/1980 | Nagata | 235/379 |
| 4,247,759 | 1/1981 | Yuris et al. | 235/381 |
| 4,300,040 | 11/1981 | Gould et al. | 235/381 |
| 4,321,672 | 3/1982 | Braun et al. | 364/408 |
| 4,361,754 | 11/1982 | Hoskinson et al. | 235/381 |
| 4,373,134 | 2/1983 | Grace et al. | 235/386 |
| 4,417,136 | 11/1983 | Rushby et al. | 235/379 |
| 4,423,313 | 12/1983 | Tanigaki | 235/379 |
| 4,423,316 | 12/1983 | Sano et al. | 235/379 |
| 4,438,366 | 3/1984 | Uchida | 235/379 |
| 4,449,186 | 5/1984 | Kelly et al. | 364/407 |
| 4,553,222 | 11/1985 | Kurland et al. | 364/900 |
| 4,562,340 | 12/1985 | Tateisi et al. | 235/379 |
| 4,569,421 | 2/1986 | Sandstedt | 186/39 |
| 4,582,172 | 4/1986 | Takeuchi et al. | 186/38 |

*Primary Examiner*—Harold Pitts
*Attorney, Agent, or Firm*—Fitch, Even, Tabin & Flannery

[57] ABSTRACT

A system is set forth which is particularly adapted for use in drive-through, fast food establishments by which a patron make his/her own selections and pay for the order with a credit card. The system includes a panel having a plurality of touch responsive switches each or several corresponding to a particular item, e.g., food, to be selected. The system recognizes the patron's credit card and account and, thereafter, the patron enters his/her selections at the panel. The selections are reproduced at, for example, the main building for filling of the order and may also be displayed at the panel for verification of the selections by the patron. After the order is complete, a credit voucher and receipt are generated at the panel and are provided to the patron, and the account is debited in the amount of the order. The patron signs the voucher accepting the credit terms represented thereby and presents the signed voucher in exchange for the order.

13 Claims, 8 Drawing Figures

FIG. 5

DRIVE-THROUGH CREDIT CARD PAYMENT DEVICE

FIELD OF THE INVENTION

This invention relates to interactive systems for menu selection and processing of said selection. More particularly, it relates to interactive systems whereupon making a selection a credit voucher is generated and the patron's credit account is debited.

BACKGROUND OF THE INVENTION

The restaurant industry has heretofore been highly labor intensive. To provide service to its patrons, sit-down types of restaurants have required personnel such as a host (or hostess) to seat the patrons and attend to their general needs, a waiter/waitress to take the patron's menu selection and communicate that selection to the kitchen and to deliver the prepared selection to the table, a cashier to receive payment for the food and service and bus boys and other personnel to assist the waiter in clean-up. The fast-food industry is also labor intensive. In a typical example, a cashier takes the patron's order, rings it up in the cash register, fills the order (or when the order cannot be immediately filled, communicates the order to the kitchen) and receives cash payment for the foods and drinks provided. This process is inefficient since the establishment must be staffed with sufficient cashiers and cooks to properly fill the orders. In those fast-food restaurants having a drive-through system where the patron drives past a menu board and verbally makes his/her selection, additional personnel by the way of a drive-through attendant or attendants are required. Aside from the inefficient utilization of personnel, obvious staffing problems cause occasional and sometimes frequent overstaffing or understaffing. The inefficient utilization of personnel causes a major concern in this establishment over payroll expenses.

While improvements in cooking and in the cost of production of the ingredients have increased, the efficiency (and profit) witnessed by restaurants, the labor costs have not witnessed like improvements.

A related problem with fast-food establishments is that the transaction is in most, if not all instances, in cash. This is particularly true in drive-through systems. It is believed that profit margins, the average order cost or other factors have caused these establishments to shun credit transactions.

Attempts have been made to increase the efficiency of restaurants and decrease the labor costs. For example, in Kurland et al, U.S. Pat. No. 4,553,222, an interactive system is set forth for a restaurant wherein the patrons enter their menu selections at each table via a monitor, which displays the menu by suitable input means. The menu selections are displayed at the kitchen and the cocktail selections are displayed at the bar. Entertainment may also be provided at the monitor. A central processing unit (the CPU) controls the menu selection and entertainment functions and, if desired, can print a composite bill which would then be delivered to the patron's table. No means are provided for identifying a particular patron account and automatically debiting the account while generating a credit voucher slip for authorization by the patron.

SUMMARY OF THE INVENTION

There is, therefore, provided according to the present invention, a system and method by which the patron is provided with credit account indicia such as a credit card. Once the patron's account has been recognized and verified, the patron makes a menu selection for processing. The selection(s) price, including tax, is automatically debited to the patron's account and a voucher slip and receipt is generated for consummating the transaction.

Toward this end, a system is set forth by which a patron may select and via a credit instrument pay for items selected from a population of items which may be foods selected from a menu. The system includes a selector panel having for each item a button switch depressable to select each desired item from the population. A video display screen may augment the selector as well as processor means coacting with the switches and screen to generate on the screen a visual representation corresponding to each item as it is selected so that the patron can visually verify the selection. In addition to providing means for the selection of items, the system also includes means for issuing a credit voucher including means for identifying the credit instrument, which may be a card or the like and the account represented thereby, means for generating a voucher for signature by the patron and verification of the acceptance of payment terms represented thereby and a receipt for the patron's record. The system includes means for debiting the patron's account and for imprinting on the voucher and receipt, for example, an indication of each item selected and a total charge therefor and a totalized charge. Also included are means or issuing the voucher and receipt to the patron for signature thereon.

For fast food drive-through arrangements, the system includes a menu board or display associated with a kiosk containing certain equipment according to the present invention. The menu board displays each item such as a food selection offered by the restaurant and its price. If desired, a conventional speaker and receiver set can be provided at the menu board by which the patron may verbally enter his selections to an attendant at the restaurant. If the patron desires to make the purchase on credit by using a credit instrument, such as a card issued by the restaurant itself, a touch panel is provided at the kiosk, the panel having associated therewith means for reading and verifying the credit instrument and the patron's account represented thereby. If the patron's account is in arrears, or for some reason not verified, the system will reject the instrument and the patron will have to make the purchase on a cash basis. If the credit account is verified, the patron will enter his/her selection at the touch panel.

The touch panel includes a plurality of switches, each switch or combination of switches adapted to indicate a particular selection by the patron. Visible and/or audible signals may be provided to indicate that the selection has been received by the system. If desired, a display screen may be associated with the panel to give the patron a visual display in alphanumeric form of each selection and the price thereof. Hence, as the selections are made, a running total of items and charges therefor is displayed. Upon completion of the entry of the order by the patron, an end sequence signal is entered into the system as by the patron depressing an appropriate button switch. Thereafter, the system totalizes the selections, adds on tax, where appropriate, and generates a grand total. This grand total is debited from the customer's credit account. The system imprints the selections, subtotal and grand total on a voucher and receipt, the voucher provided with a signature portion to be signed by the customer indicating acceptance of the credit condition attached to the credit instrument. A receipt is also generated for the customer's records. The system thereafter delivers the imprinted voucher and receipt to the customer and returns the credit instrument. The selections made by the customer are also displayed at the restaurant for filling of the order. The customer then drives up to the pick-up window and signs the voucher and hands the voucher to the attendant who, in turn, delivers the order to the patron.

Of course, it is to be understood that while the above system is particularly useful in drive-through restaurants that it could also be used in other types of restaurant situations, and in other situations where customers select from a population of items.

As can be appreciated, the system is believed to increase the efficiency of many industries, in particular the restaurant industry, since some or many of the cashiers or attendants can be dispensed with. Further, the system provides a convenient method by which a patron may make his/her selection and automatically debit a credit account and hence operate on a non-cash basis.

BRIEF DESCRIPTION OF THE DRAWINGS

These and other features and advantages of the present invention will become appreciated as the same becomes better understood with reference to the specification, claims and drawings wherein:

DETAILED DESCRIPTION

Figure 1:
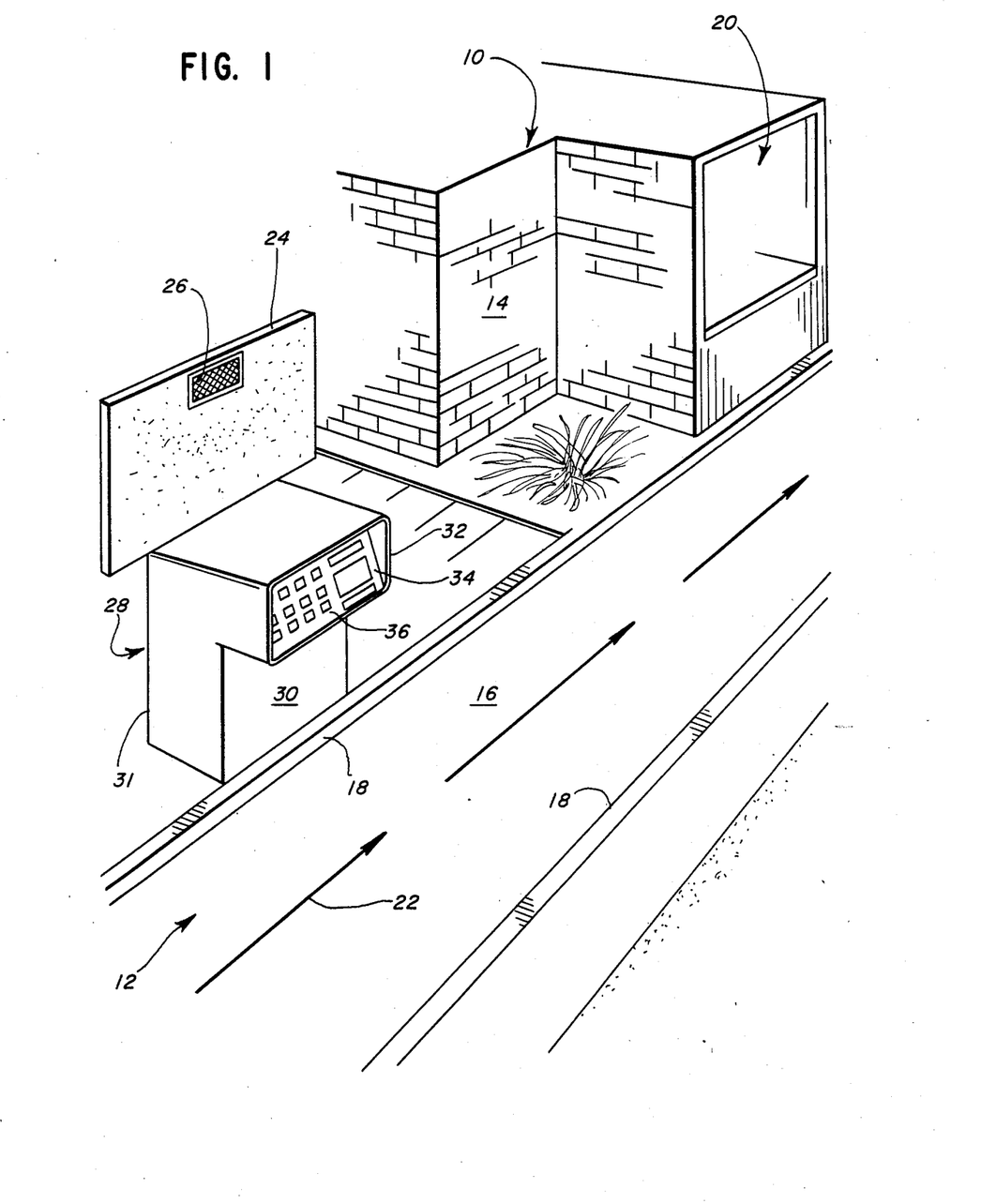
FIG. 1 is a perspective view of a portion of a drive-through establishment incorporating the system according to the present invention.

Turning to the drawings, FIG. 1 shows generally a drive-through arrangement for a fast food restaurant. The illustration and employment of the invention for a fast food drive-through is merely by way of example and it should be understood that as hereinafter described the invention is equally useful in fast food establishments not having a drive-through, in other types of restaurants and other types of industries.

With specific reference to FIG. 1, a fast food establishment 10 includes a drive-through shown generally as 12. The establishment 10 has a main building 14 in which is housed kitchen facilities, personnel, and if desired, a patron sit-down area, counter and other equipment conventionally provided in such installations. Also included are displays as hereinafter set forth for carrying out the various functions according to the present invention. Traversing adjacent the building 14 is a drive 16 defined between curbs 18 along which a motorist operates his vehicle through the drive-through 12. At a location, the building 14 may jut out to define a pick-up window 20 where the foodstuffs are ultimately delivered to the customer. To facilitate the transport of the foodstuffs between the customers sitting in their vehicle and an employee in the establishment 10, the pick-up window 20 is preferably arranged closely adjacent the drive 16.

A motorist desiring to pick-up and pay for his/her food order by traversing the drive-through 12 operates his/her vehicle along the drive 16 in the direction shown by arrow 22. At a location remote from the building 14, and along the drive 16, is a menu board 24 having displayed thereon the various selections of foodstuffs offered by the establishment 10. Each foodstuff item is listed with its price. The customer stops his/her vehicle at the menu board 24 and eyes the various foodstuff items and prices therefor in preparation to make their selection. Disposed at the menu board 24 is a transceiver or 2-way speaker 26 which enables an employee (drive-through attendant) within the main building 14 to prompt the customer selection and enables the customer to verbally make his/her selections. When the customer's vehicle reaches the menu board, typically the attendant requests that the customer make their selection, the selections being received at the speaker 26 and transmitted by suitable means to a receiving speaker (not shown) in the main building 14 where the attendant makes note of the selection and at the end of the selection process announces the total price of the customer's order. The customer thereafter motors to the pick-up window 20 and tenders, in cash, the price for the order and the attendant transfers the order to the customer.

The foregoing operation of the drive-through system wherein the customer verbally makes his/her selections has been used for some time in the fast food industry. In all instances known to this inventor, the foregoing operation has always been on a cash basis. That is, the customer enters the order, travels to the pick-up window 20 and tenders cash for the order. As can be appreciated, the operation of the drive-through 12 according to this prior art technique has required the use of at least one and perhaps several attendants to receive and make note of the customer's order as it is transmitted and to perform the various tasks necessary to fill the order. It would be advantageous from a cost of operation standpoint if all or at least some of the drive-through transactions could be made without the necessity of the attendant or at least some of the attendants. Efficient use of the personnel would follow and labor costs could be saved. It would also be desirable if the transaction could be done on a credit basis, saving time and hence labor costs in making change and handling cash, and making it more convenient for the customer who could pay, for example, on a monthly basis. These desired goals of reducing the labor force and providing for credit transactions follows not only for the fast food industry but would be a desired goal for other industries.

To provide for more efficient utilization of personnel, particularly for a fast food industry, and for transacting business on a credit basis, the present invention is provided. With reference to FIG. 1, the invention includes a kiosk 28 disposed adjacent the menu board 24. The kiosk 28 has a housing 30 defining a base 31 extending upwardly from the ground with a transverse extension 32 projecting toward and perhaps slightly into the area over the drive 16 for access by a customer from their vehicle. The extension 32 terminates at an opening 34 which reveals certain components of the system according to the present invention.

Figures 2, 4A, 4B:
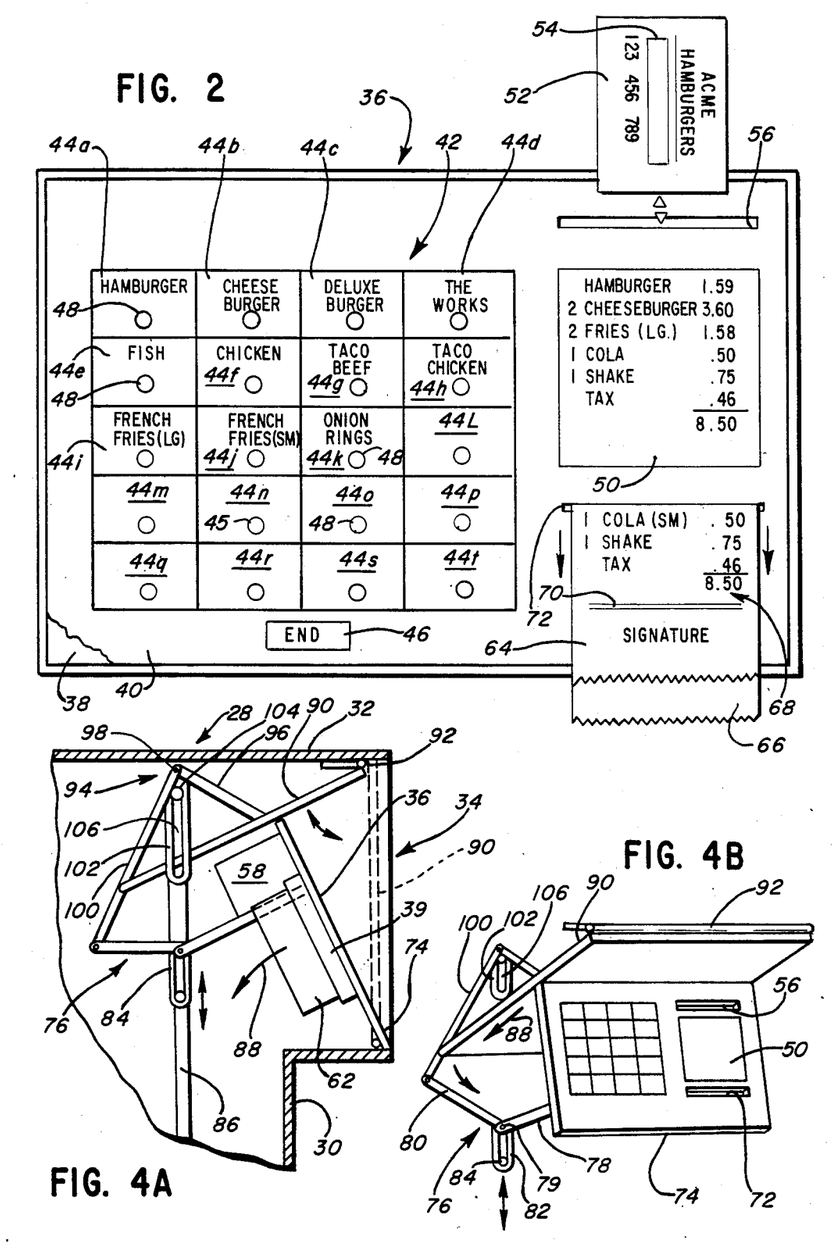
FIG. 2 is a front view of the panel for the system by which the patron may enter his/her selections and the display for said selections.
FIG. 4A is a side section view of a portion of a kiosk incorporating the panel according to the present invention including means for storing and protecting the panel when not in use.
FIG. 4B is a perspective view of portions of the mechanism for storing and protecting the panel illustrating the operation thereof.

Disposed in the kiosk 28, and presented at the opening 34 is a panel 36 incorporating various features according to the present invention. The panel 36 communicates, via an underground cable or the like, with the main building 14, its various video displays as hereinafter set forth and processing equipment. As illustrated, the panel 36 may be somewhat slanted for ease of operation by the motorist/customer. With reference to FIG. 2, the details of an exemplary panel 36 will now be described.

The panel 36 includes a panel board 38 providing support for the various components of the panel 36. Located on the board 36 are a plurality of button switches (not shown) of known design which interact with various processing equipment. A flexible skin 40 of durable, washable plastic or the like overlays the board 36 and the various button switches thereon. The skin 40 is embossed or imprinted with indicia which identifies the various switch buttons. For example, the skin 40 may be imprinted with a matrix design or grid 42 each coordinate defining an area superimposed over a designated button switch. By way of example and as illustrated in FIG. 2, depending upon the number of selections provided by the establishment 10, twenty coordinate locations defining buttons 44a-t are defined, each button representing a particular foodstuff item to be selected. Additionally defined on the panel 36 are buttons, for example, for example 44t, representing a cancel or "clear entry" control and a selection end button 46. It is to be understood that the panel could also be embodied as a touch screen which, via a monitor, displays a representation of the grid 42 and includes light switches or the like which are interrupted when a portion of the screen is touched.

The customer when making his/her selections, for example, depresses button 44a to select a hamburger, button 44g to select a beef taco, and button 44k to select onion rings. As described below, this selection is communicated to the main building 14 displays so that personnel therein can fill the orders. To aid the customer in their selection, an indicator light 48 associated with each button and defined, for example, by an indicator light underlying a transparent area of the skin 40, may be provided. These lights may be green, for example. Accordingly, when the customer touches button 44a to make the selection of the hamburger, light 48 will flash indicating to the customer that the selection has been entered. To provide an indication of the quantity of any particular one foodstuff selected, means may be provided for controlling the intensity of the lights 48. For example, upon selection of a first hamburger, light 48 would decrease slightly in intensity. After the selection of the second hamburger, the intensity would reduce still further. Hence, by perceiving the intensity of the light 48 the customer can determine the number of any particular items selected. Of course, each time a selection is made the light 48 would flash signifying that the selection has been made. To further signify the entry of a selection an audible tone may be generated.

At the end of the selection process, i.e., when all items desired have been selected, the patron would depress button 46 indicating the end of the selection process and terminating at least that portion of the transaction for the customer.

While not necessary, but preferred, the panel 36 may also include a CRT video display 50. The display 50 is adapted to indicate what selections have been made, the total charge to the customer for those selections and, if desired, the itemized cost breakdown. Hence, in addition to or in lieu of the means for controlling the intensity of the lights 48, as each selection is made, it is displayed at display 50. If the appropriate button is depressed several times indicating a selection of the plurality of a particular item, the display 50 would signify the number being selected. Hence, the customer can quickly and easily verify the selections made. An acronym system for abbreviating the selections may be adopted as necessary. Further scroll-up or scroll-down controls may be necessary for selections of a large number of items, of course, depending upon the size of the display 50 and the manner in which the items are presented.

As can be appreciated and as hereinafter will become apparent, the patron is able to enter his/her own selections, verify those selections either by means of the lights 48, audible tone, or the display 50 or combination thereof, the selections being communicated to the main building 14 and presented upon suitable displays in the kitchen and/or pick-up window 20 such that personnel can properly fill the order. Since the customer inputs their own selections into the system an attendant or the number of attendants can be reduced thereby eliminating certain labor costs.

To enable the transaction between the customer and the establishment to be made on a credit basis, the customer is provided with a credit instrument in the form of a credit card 52 as shown in FIG. 2 and as well known in the art. The card 52 may be issued by the establishment, i.e., a McDonald's, Burger King card, or may be a card issued by a bank or other credit institution, i.e., Master Card, Visa. The card 52 represents a credit account for the customer created pursuant to an application therefor and acceptance of the terms of payment of the account by the customer. At each billing cycle, i.e., monthly, the issuer of the card 52 submits a statement to the customer for payment. Traditionally, these statements include a date of purchase, merchant identification means, and the amount of purchase. Each card 52 for identification thereof by the system according to the present invention includes a magnetic strip 54 encoded with customer account identification means recognizable by the system. Of course, the card 52 or credit instrument may be encoded by other suitable electronic means, by bar code or other means in existence or hereinafter developed. Suffice it to say the card 52 includes a machine readable means for identifying the customer account represented by the card 52.

To receive the card 52, the panel 36 includes means for reading the card 52. By way of example, the panel 36 includes a slot 56 into which the customer inserts the card 52 for recognition by the system. The card 52 which may be driven into registry with an appropriate card reader 58 (FIG. 4A), is received into the system and may be held during the customer selection process. The reader 58 communicates the account information to a processor (not shown) contained within the main building 14 which verifies the account and its status, i.e., not in arrears. Once the account is recognized and verified, a prompt which may be displayed at display 50 or may be an audible tone is generated indicating to the customer to begin the selection process. The processor may be linked with a central processor which maintains the accounts and their status for all cardholders.

In conjunction with the means for recognizing the credit instrument, the system according to the present invention also includes means for generating a transaction slip shown as 60 in FIG. 2. These means includes an imprinter shown generally as 62 in FIG. 4A, the imprinter including means for feeding individual packs of slips 60 or a roll of slips and means for severing the slips as desired. The slip pack 60 includes in its most rudimentary embodiment a voucher 64 and a receipt 66. At the end of the selection process, the imprinter 62 imprints, preferably simultaneously, the voucher 64 and receipt 66 with a listing of the items selected, the charges therefor, tax and a total shown as 68. To provide for the simultaneous imprintation of the voucher 64 and receipt 66, the slip pack 60 may be of the type having carbonless transfer medium therebetween. Hence, as the imprinter impacts the voucher 64 the image is transferred to the receipt 66. The slip pack 60 or at least the voucher 64 also has imprinted thereon a signature line 70 and merchant identifying information and time and date. The imprinter 62 delivers the slip pack 60 from a delivery slit 72 at the panel 36. The customer thereafter removes the slip pack 60 for signature authorization of the credit purchase.

Of course, it is to be understood that a conventional credit instrument slip pack having three or more individual slips may be generated.

Figure 3:
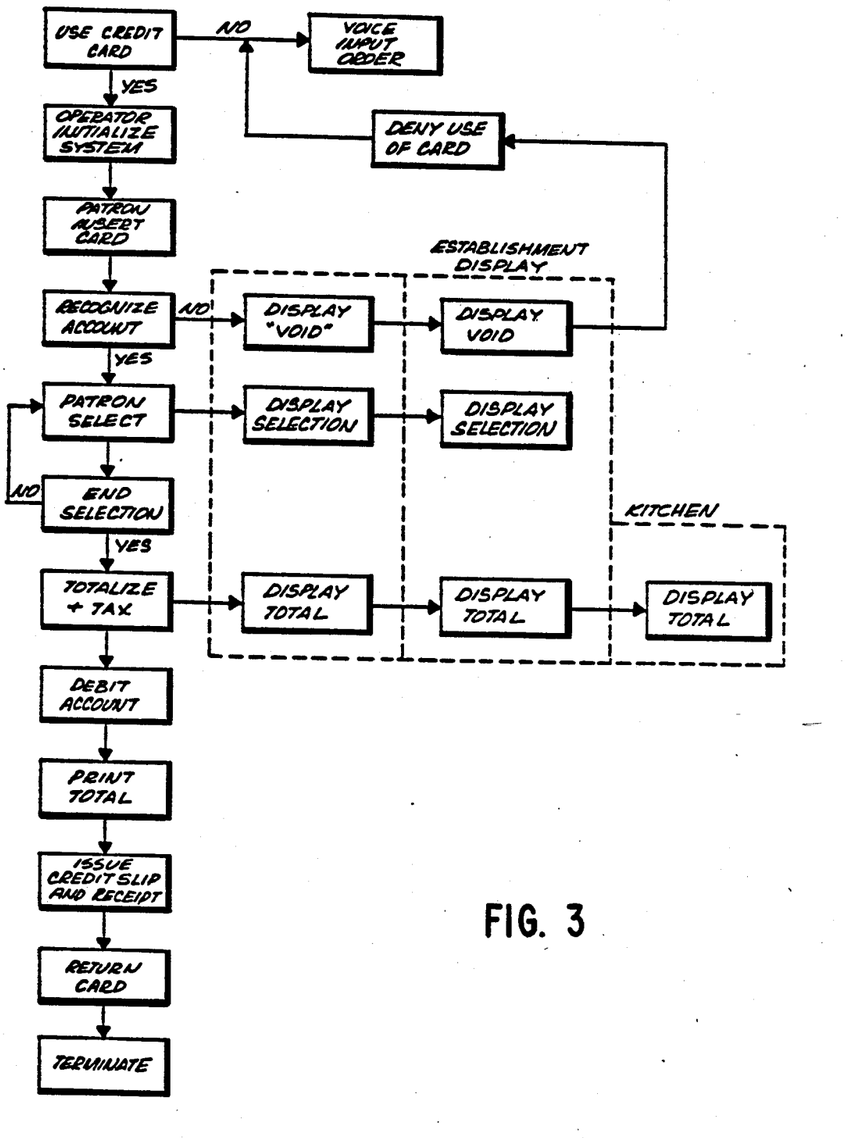
FIG. 3 is a logic diagram illustrating the operation of the system according to the present invention.

With reference to FIG. 3, the operation of the system according to the present invention is shown. Upon arrival at the kiosk 28, the patron would be requested to signify whether the purchase is going to be on a cash basis or credit basis. The request may be done audibly through speaker 26 by an attendant in the main building 14 or may be by other suitble means such as a voice sensitizer or the like. If the patron signifies that the purchase is going to be on a cash basis, if desired, the system may be rendered inactive and the patron would make his/her selections verbally to the speaker 26 in the manner described above. The selections are noted by an attendant in the main building 14. Should the patron indicate that the purchase is going to be made on a credit basis, the system would be initialized and the panel 36 presented for operation by the patron. The patron would insert their particular credit instrument or card 52 into the slot 56 for recognition and authorization of the customer's account. Should the account not be recognized or be in arrears, a void indication would be displayed at display 50 and at the establishment display and use of the card 52 would be denied. Accordingly, the patron would have to proceed thereafter on a cash basis. If the account is recognized, the system would enter the selection mode whereupon the patron makes his/her selections in the manner described above by depressing selective buttons 44a-s. As the selections are being made, a display 50 verifies the selection and the selections are also displayed at a suitable monitor in the main building 14 informing personnel therein of said selections. After the patron has finished selecting the desired item or items, end button 46 is depressed, signaling the system of the end of the selection process whereupon the CPU totalizes the selection, adds tax and generates a total 66. The total is displayed at terminal 50 and at a monitor in the main building 14 and, if desired, in the kitchen within the main building, so that cooking personnel are aware of the selections and can schedule their preparations of the foodstuffs. The system at the same time debits the customer's account in the amount of the purchase indicating the date of purchase and some type of establishment identification, i.e., merchant number. At the panel 36, the imprinter 62 imprints upon the slip pack 60 the items selected, prices, tax, and the total 68 and issues the slip pack 60 to the customer. The customer thereafter removes the slip pack 60 from the panel 36 and the card 52 from the slot 56. Thereafter, the customer motors to the pick-up window 20, signs the voucher 64 at the signature line 70 and presents the voucher 64 to an attendant at the pick-up window 20. The attendant receives the voucher 64 for their records and hands the items selected to the customer. The customer then drives away with their credit purchase of the foodstuffs.

The CPU within the main building 14 communicates with a main accounting processor for generating monthly statements to customers. Alternatively, the CPU at the main building 14 may be unloaded onto a tape or disk which is thereafter transported to the building facility. The signed vouchers 64 are retained as a record for verification of the purchase by the customer.

As can be appreciated, the system according to the present invention provides for the customer to make his/her own selection thereby not requiring personnel for that purpose. Heretofore, clerks have been required to receive the order and hence for that time are unavailable for other tasks. By the patrons entering their own selections, efficient use of personnel and minimization of labor costs are obtained. Further, the facility of the system for providing for a credit purchase is believed to be of significant importance to customers who do not like to carry cash, or may not have cash on hand. The benefit of a monthly statement may also be significant for record keeping purposes.

It is to be understood that the system according to the present invention need not strictly be employed in establishments having drive-throughs 12. The system could well be employed at the counter of the establishment for walk-in business and could be used in non-food industries.

When the panel 36 is not in use, for whatever purpose, it is beneficial to safely house the panel 36 from the elements and from vandalism. With reference to FIGS. 4A and 4B one such mechanism is hereinafter described. The panel 36 is pivotally joined along its lower margin 74 to the extension 32 at the opening 34. Connected at at least one side margin of the panel 36 is a panel linkage 76. Panel linkage 76 includes a first link 78 pivotally joined at one end to the panel 36 and having at the other end a pin which pivotally mounts one end of a second link 80. Opposite the pin 79, the second link 80 is pivotally attached to the kiosk housing 30.

To pivot the panel 36 away from the opening 34 for concealment thereof, the linkage 76 further includes a lost motion actuator link 82 receiving an actuator 84 of an actuator rod 86. Movement of the rod 86 downwardly from the position shown in FIGS. 4A and 4B moves the pin 79 downwardly operating the first and second links 78 and 80 to pivot the panel 36 in the direction indicated by arrows 88 to pivot the panel 36 about its lower margin 74 inwardly and downwardly into the housing 30 for concealment thereof.

To close the opening 34 for protection of the panel 36 and other components within the kiosk 28, a protective flap 90 is provided within the extension 32 and is connected along its upper margin by a hinge 92 to the extension 32. When the panel 36 is displayed, the flap 90 is withdrawn into the housing 30 in the manner illustrated. When it is desired to conceal the panel 36 and to protect the components of the system within the kiosk 28 from the elements and vandalism, the flap 90 upon withdrawal of the panel 36 from the opening 34 is urged downwardly to fill the opening 34 as shown by phantom in FIG. 4A. For this purpose, flap linkage 94 is provided including an arm 96 pivotally attached at one end to at least one side margin of the flap 90 and at the other end to a pin 98. A leg 100 is pivotally attached at one end to the pin 98 and at the other end to the housing 30. A slide 102 is likewise connected to pin 98 and receives a second actuator 104 which is likewise attached to the actuator rod 86. Slide 102 has a track 106 slidably receiving the second actuator 104.

When concealment of the panel 36 is desired, the actuator rod 86 is driven downwardly pivoting the panel 36 about its lowermost margin 74 in the manner described above to withdraw the panel 36 into the housing 30. During the pivoting of the panel 36, the second actuator 104 slides downwardly along the track 106. At such time as when the panel 36 has been pivoted inwardly to clear the lowermost margin of the flap 90, the second actuator 104 bottoms in the track 106 and urges the pin 98 downwardly causing the arm 96 and leg 104 to manipulate the flap 90 in a manner so as to position it to cover the opening 34. In this position, the flap 90 is locked by the flap linkage 94. In the completely closed position, the second actuator 104 is disposed at the top of the track 106.

When it is desired to present the panels 36 for operation by a customer, the actuator rod 86 is driven upwardly by suitable means pivoting the flap 90 inwardly about its hinge 92 revealing the opening 34. At such time as when the flap 90 has pivoted to a position providing sufficient clearance for the panel 36, the first actuator 84 urges the pin 79 upwardly reversible pivoting the panel 36 ultimately to its reveal position shown in FIG. 4A. In this position, the panel 36 is locked.

As can be appreciated, the operation of the system provides protection for the panel 36 and the other components housed within the kiosk.

Figure 5:
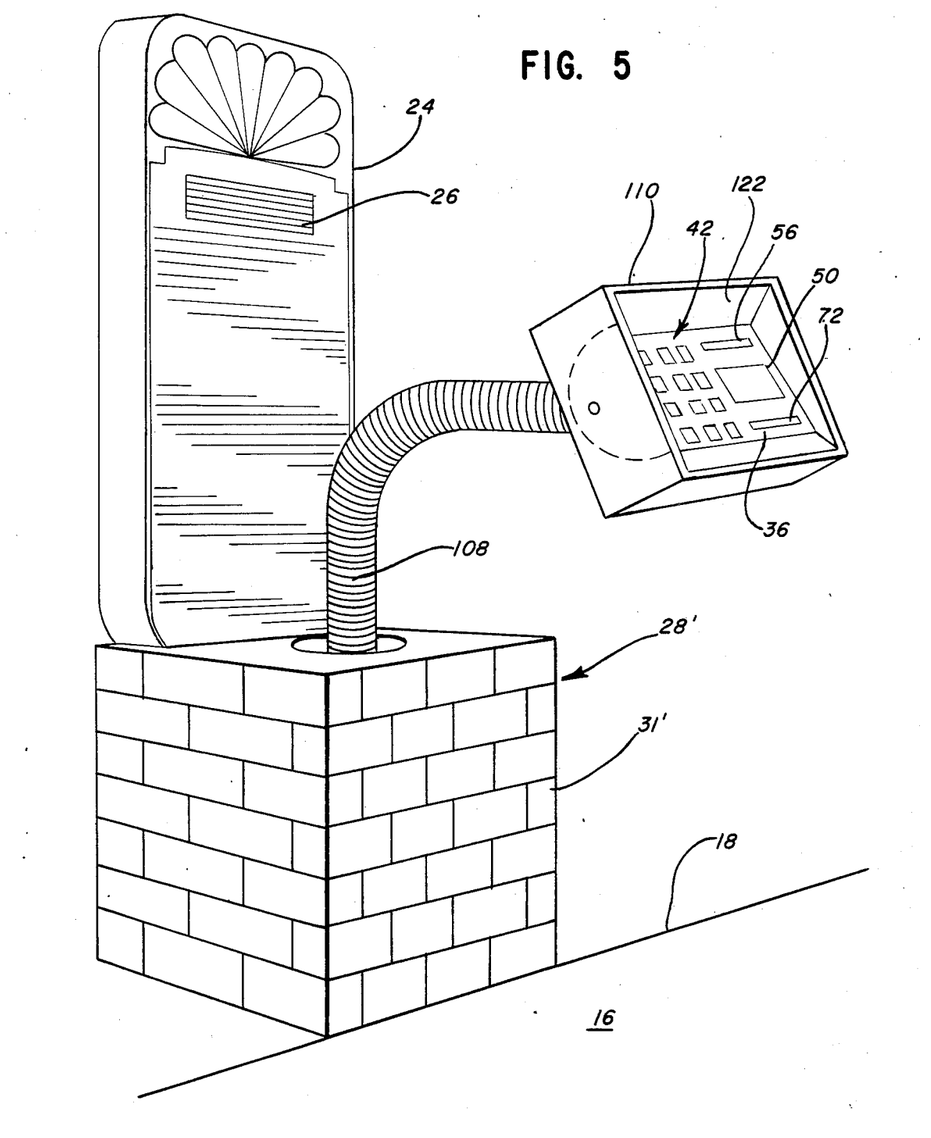
FIG. 5 is a perspective side view of an alternative kiosk for the system according to the present invention.
Figure 6:
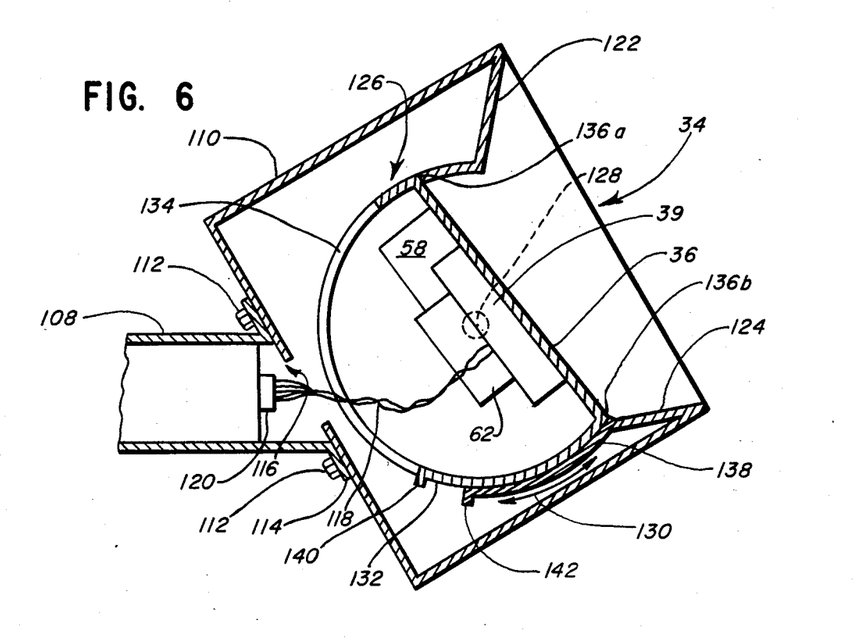
FIGS. 6 and 7 are side section views of a portion of the kiosk of FIG. 5 illustrating the operation of the panel in a first position for manipulation by a patron and in a second position at which the panel is protected from the elements and vandalism.
Figure 7:
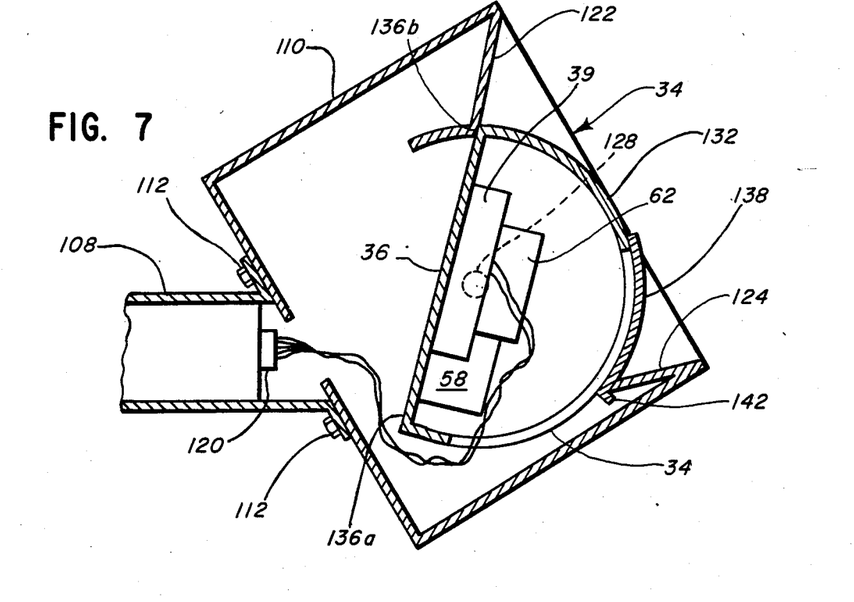

Turning to FIGS. 5–7, a further embodiment of the kiosk according to the present invention is shown. Like components carrying the same reference numerals.

According to the embodiment, the kiosk 28' has a base 31' which may be provided with an aesthetically pleasing brick exterior. The menu board 24 projects upwardly from the base 31' displaying the various selections. A speaker 26 is provided at the menu board for audibly entering the customer selection.

Extending upwardly and forwardly (towards the drive 16) is a tubular neck 108 having at its end a rectangular, box like head 110 housing the panel 36 of the type described above. When the patron has elected to make his/her purchase on credit, the panel 36 is presented for that purpose. Electronic cables extend from the panel 36 through the neck 108 into the base 31' and, via underground cables or the like, to the main building 14.

With specific reference to FIGS. 6 and 7, means are illustrated for presenting and concealing the panel 36 as desired. The head 110 is attached by bolts 112 to a flange 114 for the neck 108. The head 110 has an aperture 116 which registers with the hollow neck 118 to pass an electronic cable 118 communicating with the appropriate processor. For removal of the head 110, a multiple connection jack 120 is provided for coupling the cable 118 to a similar cable (not shown) passing along the length of the neck 108 into the base 31'.

Opposite the aperture 116 the head 110 has the opening 34 providing access to the panel 36 for operation of the system. At the uppermost margin of the panel 36, an angular wall 122 is provided and at the lowermost edge a footing 124.

The panel 36 is disposed upon a semi-cylindrical drum 126 disposed within the head 110 for rotation about a horizontal axis. At each end of the drum, a horizontally arranged stub shaft 128 journals the drum 126 to the head 110 for rotation in the direction indicated by arrow 130. The drum 126 has a semi-cylindrical backing 132 which is solid along its axial extent, the backing 132 being provided with a peripheral cable way 134 arranged in a radial plane and passing the cable 118 which extends from the panel 36 and the components thereof through the aperture 116. The backing 132 joins the panel 36 at its upper and lower margins 136a–b, respectively. When in the display position, the upper margin 136a adjoins wall 122 whereas lower margin 136b adjoins footing 124. Hence, the panel 36 is presented for operation by the customer.

When it is desired to conceal the panel 36 to protect its components from the elements and vandalism, means are provided for rotating the drum 126 about the shaft 128 to the panel concealed position shown in FIG. 7. For this, drive means (not shown) are provided and are coupled to one of the shafts 128. When energized, the drive means rotates the drum in a counterclockwise direction to a concealed position whereat the lower margin 136b engages or lies adjacent wall 122. THe way 134 accommodates the cable 118 during the rotation of the drum 126. At the concealed position, the drive means stops the rotation and locks the drum 126 in the concealed position. As can be appreciated, in this position the backing 122 is presented at the opening 34 thereby protecting the panel 36 and the other components of the system.

To cover any portions of the way 134 exposed at the opening 34, when the drum 126 is in the panel concealed position, a movable, arcuate cover 138 is provided at the footing 124. As the drum 126 rotates in the counterclockwise direction, a tab 140 provided thereon passes through a track (not shown) along the cover 138, engaging a stop (not shown) at the forward end, i.e., the end of the cover 138 at the opening 34, to pull the cover 138 from the head 110 as the drum 126 rotates. The cover 138 has a stop 142 at its rear end to engage the footing 124 to limit its extension from the head 110. As can be appreciated from FIG. 7 in the concealed position, the drum 126 has pulled the cover 138 over the way 134 over the extent thereof presented at the opening 34.

To present the panel 36 for operation thereof by a patron, the drive means is reversibly driven to rotate the drum 126 in a clockwise direction the position shown in FIG. 6. The cover 138 may be spring loaded to maintain engagement with the tab 140 such that as the drum 126 is rotated in a clockwise direction, the cover 138 is withdrawn into the head 110.

While I have shown and described certain embodiments of the present invention, it is to be understood that it is subject to many modifications without departing from the spirit and scope of the appended claims.

What is claimed is:

1. A system by which a patron may select and, via a credit instrument representing a patron credit account, pay for items selected from a population of items vended by an establishment, the system comprising:

a panel disposed for operation by or for the patron, the panel including a plurality of touch responsive means adapted to generate signals corresponding to the selection of the desired item from the population;

means for communicating said selection signals to a remote location at the establishment and repeating said selections for retrieval of said selections by establishment personnel;

a processor storing patron account information;

means at said panel communicating with the processor for recognizing said credit instrument and accessing the patron account represented thereby;

means for processing said signals including means for totalizing the totalized charge therefor and means for debiting said patron account in the amount of said totalized charge; and means for generating a printed credit voucher and receipt including at least said totalized charge, said voucher further including a portion designated to receive the patron's signature acceptance of said charge on said account.

2. The system of claim 1 further including means at the panel for verifying each selection.

3. The system of claim 2 wherein the verifying means includes an indicator light associated with each touch responsive means, said light emitting a flash upon the touching of the associated touch responsive means.

4. The system of claim 3 further including means for altering the intensity of each indicator light in response to the repeated touching of the selection corresponding to said light.

5. The system of claim 2 further including video display means at the panel and means for interfacing said display means with the touch responsive means to display a visual representation of each item selected.

6. The system of claim 5 wherein said interfacing means also communicates with the processing means to display said totalized charge.

7. The system of claim 1 wherein the generating means is adapted to also imprint each selection on said voucher and receipt.

8. A drive-through system by which a patron may select from their vehicle and, via a credit instrument representing a patron account and including machine readable indicia for identifying said account, pay for items vended by an establishment, the system comprising:

a panel disposed for operation by or for the patron from their vehicle, the panel including a plurality of touch responsive means adapted to generate signals, each corresponding to the selection of a desired item, said touch responsive means, when touched by the patron, effective to enter a selection;

means for communicating said selection signals to a location at the establishment and for displaying said selection for retrieval of said selections by establishment personnel;

a processor storing patron account information;

means at said panel for machine reading said credit instrument indicia;

means communicating with the processor for recognizing said indicia and accessing the patron account;

means for processing said touch generated signals including means for identifying the selection made, the price thereof and for calculating a totalized charge for said selections; and means for imprinting on a credit voucher and receipt said identified selections and totalized charge, said voucher including a designated portion to receive the patron's signature acceptance of said totalized charge on account.

9. The system of claim 8 further including means for verifying the touch selection of an item including a light associated with the touch responsive means visually indicating said item selection.

10. The system of claim 8 further including a video display screen and means for visually displaying a representation of each item selected for visual verification of said selection.

11. The system of claim 8 wherein said panel is disposed in a remote housing, the system further including means for positioning the panel for concealment thereof when not in use.

12. A method for vending goods on a credit basis comprising:

providing a system including a panel disposed for operation by a patron, said panel including a plurality of touch responsive means adapted to generate signals corresponding to the selection of the desired goods, means for receiving and reading a patron credit card and for transmitting patron account information stored on the credit card and printing means, said system further including patron account storing and retrieval means;

the patron inserting the credit card into the receiving means at the panel;

the system transmitting the account information to the account storing and retrieval means to access the patron's account;

the patron making selections of goods at the panel, the system receiving the signals generated thereby and totalizing the selections and debiting the patron account in the amount of said selection(s) plus tax where applicable;

the system displaying the selection remote from the panel for filling of the patron's order;

the system printing a receipt and voucher indicating at least said amount and returning the credit card; and the patron signing the voucher to authorize the credit charge and presenting the signed voucher in exchange for the goods representing said selection.

13. A method for vending goods on a credit basis at a drive-through establishment;

providing a system including a panel located for operation by a patron from their vehicle, the panel including a plurality of touch responsive means adapted to generate signals corresponding to the selection of desired goods, means for receiving and reading a credit card and for transmitting patron account information stored on the credit card and printing means for issuing a printed receipt and voucher, the system further including patron account storing, retrieval and processing means;

the patron from their vehicle inserting their credit card into the receiving means;

the system reading and transmitting account information to the account storing, retrieval and processing means for retrieval and verifying of the account;

the patron entering his order by making selections by touching the appropriate touch responsive means at the panel, the system processing the signals generated thereby and debiting the account in the amount of the selections displaying the selections in the establishment for filling of the patron's order;

issuing a printed receipt and voucher indicating at least said amount at the printing means and returning the credit card; and the patron signing the voucher to authorize the account debit and presenting the signed voucher in exchange for the order.

* * * * *